United States Patent [19]
Matsuoto et al.

[11] Patent Number: 6,102,547
[45] Date of Patent: Aug. 15, 2000

[54] ILLUMINATION DEVICE

[75] Inventors: Hideaki Matsuoto, Hachioji;
Toshifumi Nakano, Sagamihara;
Hiroaki Miyazaki, Kanagawa, all of Japan

[73] Assignee: Olympus Optical Co., Ltd., Japan

[21] Appl. No.: 09/127,342

[22] Filed: Jul. 31, 1998

[30]  Foreign Application Priority Data

Aug. 1, 1997 [JP] Japan .................................. 9-207446

[51] Int. Cl.$^7$ ........................... G03B 15/02; G03B 15/06
[52] U.S. Cl. ........................... 362/16; 362/217; 362/296; 362/347; 396/200
[58] Field of Search ............................. 362/16, 217, 296, 362/341, 346, 347, 350; 396/200

[56]  References Cited

U.S. PATENT DOCUMENTS

| | | | |
|---|---|---|---|
| 4,304,479 | 12/1981 | Van Allen | 362/16 |
| 5,727,861 | 3/1998 | Motohashi | 362/16 |

*Primary Examiner*—Cassandra Spyrou
*Assistant Examiner*—Darren E. Schuberg
*Attorney, Agent, or Firm*—Ostrolenk, Faber, Gerb & Soffen, LLP

[57]  ABSTRACT

An illumination device having a light-emitting tube and a reflector for reflecting rays of light irradiated from the light-emitting tube is designed so that the cross-sectional shape of at least one section of the reflector in a plane perpendicular to the axis direction of the light-emitting tube is different from the cross-sectional shapes of the other sections in the axis direction of the light-emitting tube.

26 Claims, 13 Drawing Sheets

VIGNETTING PORTION

ILLUMINATION DEVICE

BACKGROUND OF THE INVENTION

1. Field of the Invention

The present invention relates to an illumination device and, more particularly, to the shape of a reflector used in a flashlight-emitting device for a camera or the like.

2. Related Art Statement

FIGS. 24 to 32 are views for explaining a conventional flashlight-emitting device for a camera, in which FIG. 24 is a perspective view showing the appearance of a flashlight-emitting device for a camera, FIG. 25 is a cross-sectional view showing the flashlight-emitting device in a direction perpendicular to the axis of a light-emitting tube, FIG. 26 is an upper view of a reflector 2, and FIG. 27 is a front view of an opening portion of the reflector 2.

As shown in FIG. 24, a flashlight-emitting device for a camera is generally constituted by a flashlight discharge tube 1 in which a xenon (Xe) gas or the like is sealed, and a reflector 2 for reflecting light from the flashlight discharge tube 1 in the forward direction. The cross-section perpendicular to the axis direction of the flashlight discharge tube 1, as shown in FIG. 25, is formed to have an elliptical shape or an almost quadratic-curve shape.

As shown in FIG. 24, the side-surface portions of the reflector 2 are constituted by flat plates. As is also apparent from the upper view in FIG. 26, the side-surface portions diverge at a predetermined angle toward the opening portion.

FIGS. 28 to 32 are views for explaining the problems of the conventional flashlight-emitting device for a camera.

FIG. 28 shows a state wherein the shape of an opening portion is changed with respect to the shape of the opening portion of the camera body, and FIGS. 29 and 30 show cross-sectional views of the central portion in FIG. 28. FIG. 29 shows a state wherein the opening portion of the reflector 2 is partially cut away, and FIG. 30 shows a state wherein the opening portion of the reflector 2 is partially masked.

As shown in FIG. 28, when the light-emitting opening portion of the reflector 2 is built in the front surface of the camera body to face an object to be photographed, if the area of the opening portion of the body arranged on the front surface of the camera body is almost equal to the area of the opening portion of the reflector 2, light irradiated on the object is not vignetted (as is the case shown in FIGS. 31 and 32), so that light loss does not occur.

However, when the area of the opening portion of the camera body M is smaller than the area of the opening portion of the reflector 2 as shown in FIG. 28 for scheming or designing convenience, the outer peripheral portion of the reflector 2 is partially cut away as shown in FIG. 29 to make the size of the opening portion of the reflector 2 equal to the size of the opening portion of the camera body, or a predetermined portion of the reflector 2 is covered with a mask 3 to make the sizes of the opening portions equal to each other as shown in FIG. 30. For this reason, loss of light irradiated on the object is large.

More specifically, when the reflector 2 is cut as indicated by a dotted-line portion as shown in FIG. 29, rays of light which would have reflected off the removed surfaces of the reflector are lost. Therefore, a problem of loss of light rays occurs. As shown in FIG. 30, when the reflector 2 is covered, light is reflected and absorbed by the mask 3, which also causes the problem of loss of light rays to occur.

In addition, when the opening portion of the reflector is formed to have a predetermined shape for design, loss of light rays occurs depending on the shape of the opening portion.

OBJECTS AND SUMMARY OF THE INVENTION

It is a first aspect of the present invention to provide an illumination device which has highly efficient convergence of light and is free from loss of light rays even if the exposure area of the opening portion of a camera body in which a reflector is set is not equal to the area of the opening portion of the reflector.

It is the second aspect of the present invention to provide an illumination device which has highly efficient convergence of light and is free from loss of light rays even if the opening portion of a camera body in which a reflector is set changes in height to be different from that of the opening portion of the reflector for schematic or design convenience purposes.

An illumination device having a light-emitting tube and a reflector for reflecting rays of light irradiated from the light-emitting tube has the following characteristic feature.

The shape of at least one section arranged on the reflector and viewed perpendicular to the axis direction of the light-emitting tube is different from the shapes of the other sections along the axis direction of the light-emitting tube.

These aspects and advantages of the present invention will become further apparent from the following explanations and descriptions.

DETAILED DESCRIPTION OF THE PREFERRED EMBODIMENTS

Embodiments of the present invention will be described below with reference to the accompanying drawings.

FIGS. 1 to 4 are views for explaining a first embodiment of the present invention, and show a flashlight-emitting device arranged in a camera as an illumination device.

Figure 1:
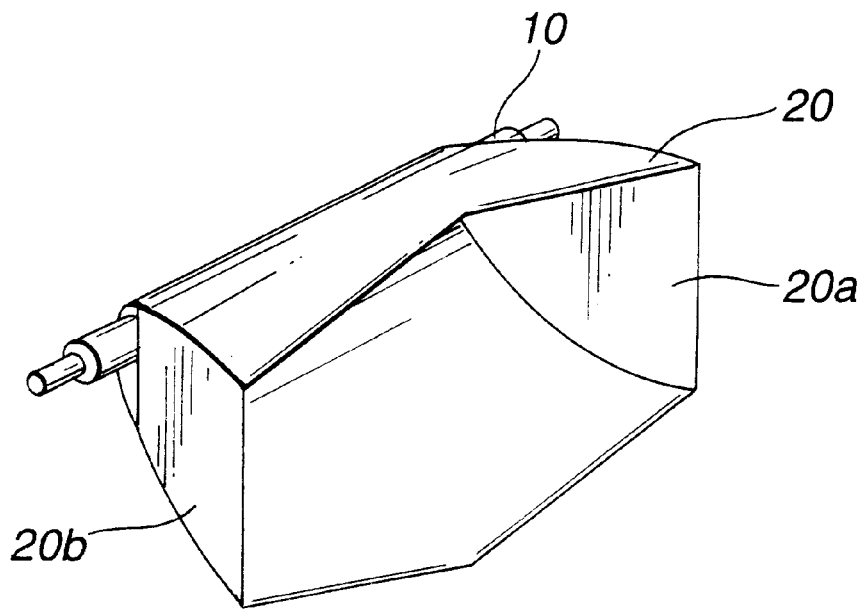
FIG. 1 is a perspective view showing the appearance of a flashlight-emitting device for a camera according to a first embodiment of the present invention.
Figure 2:
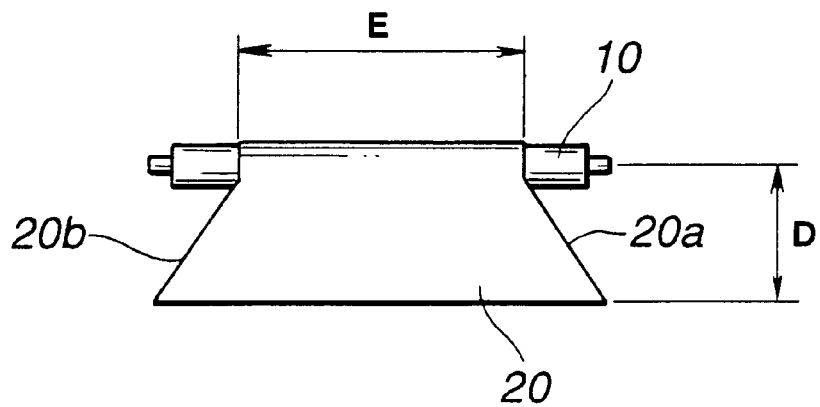
FIG. 2 is an upper view showing the flashlight-emitting device for a camera according to the first embodiment.
Figure 3:
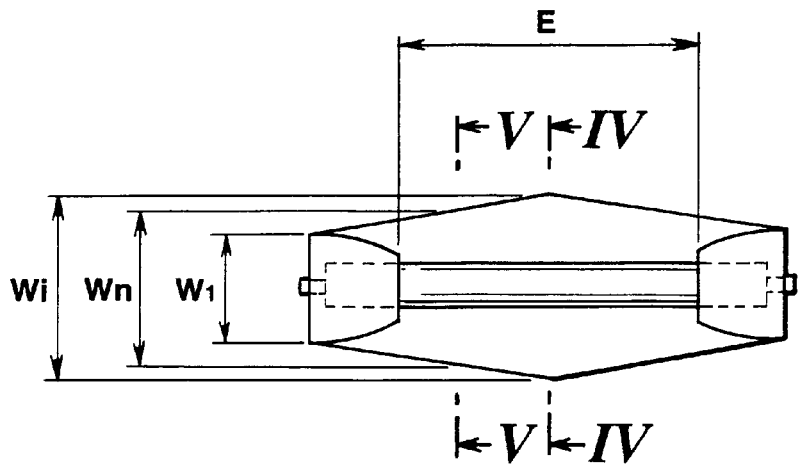
FIG. 3 is a front view showing the flashlight-emitting device for a camera according to the first embodiment when viewed from an opening portion side.

FIG. 1 is a perspective view showing the appearance of a flashlight-emitting device used in a camera, FIG. 2 is an upper view showing the flashlight-emitting device, and FIG. 3 is a front view showing the shape of the opening portion of the flashlight-emitting device.

Figure 4:
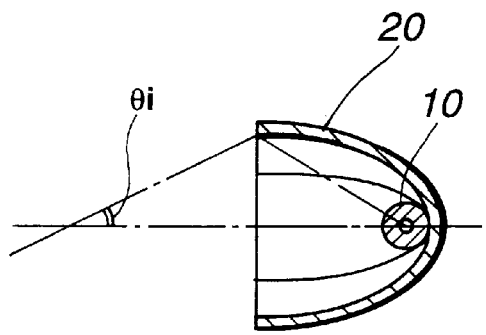
FIG. 4 is a cross-sectional view showing the central section of the flashlight-emitting device for a camera according to the first embodiment.
Figure 5:
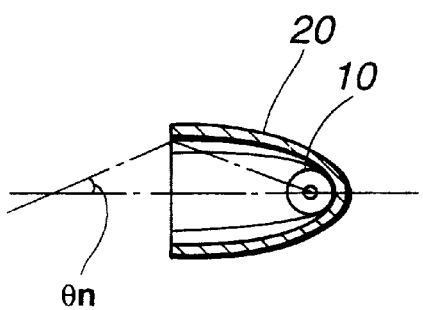
FIG. 5 is a cross-sectional view showing a section of the flashlight-emitting device for a camera according to the first embodiment to one side with respect to the center of the device.

FIGS. 4 and 5 are cross-sectional views showing the flashlight-emitting device at the two positions indicated in FIG. 3.

As shown in FIGS. 1 to 3, the flashlight-emitting device according to this embodiment is constituted by a cylindrical flashlight discharge tube 10 and a reflector 20 consisting of an aluminum thin plate having an inner surface serving as a reflecting surface. As shown in FIGS. 4 and 5, the cross-sectional shape of the reflector 20 is elliptical in shape which is a conical curve.

On the reflector 20, as shown in FIG. 2, side reflecting plates 20a and 20b are formed such that the side reflecting plates 20a and 20b diverge from the end portions of an effective light-emitting region E of the flashlight discharge tube 10 toward the opening portion. The side reflecting plates 20a and 20b are formed such that a depth D, which is the distance from the flashlight discharge tube 10 to the opening portion, is set to be a predetermined value.

As shown in FIG. 3, the shape of the front opening portion is formed such that a opening width W perpendicular to the axis direction of the flashlight discharge tube 10 gradually changes from the substantially central portion of the flashlight discharge tube 10 (see FIG. 4) to the left and right sides within a range from Wi to W1.

FIGS. 4 and 5 show two cross-sections perpendicular to the longitudinal axis direction of the flashlight discharge tube 10 within the effective light-emitting region E of the flashlight discharge tube 10 shown in FIG. 3. As shown in FIG. 3, the cross-sectional shape shown in FIG. 5 is an elliptical shape having an opening width Wn. Similarly, the cross-sectional shape of the substantially central portion shown in FIG. 4 is an elliptical shape having an opening width Wi. The first focal point positions of these ellipses coincide with each other. The axial center of the flashlight discharge tube 10 is located at the first focal point of each elliptical cross-sectional shape.

Therefore, at each cross-section, substantially all the rays of light emitted from the flashlight discharge tube 10 are reflected by the reflector 20 at an angle, for example, of Θi or Θn in the examples above, and then reflected within the range passing through the second focal point of the elliptical shape having the opening width Wi or Wn in the examples above.

As described above, the sizes of the cross-sections perpendicular to the longitudinal axis direction of the flashlight discharge tube 10 are made different from each other with respect to the cross-section of the substantially central portion of the flashlight discharge tube 10, and light reflected by each of the cross sections passes through the focal point position of the corresponding ellipse, so that the reflection efficiency is not degraded. Therefore, when the exposure area of the opening portion of the camera body in which the reflector is set is not equal to the size of the opening portion of the reflector, or when the shape of the opening portion of the reflector must be changed for design purposes, if the opening portion of the reflector has a varying opening width W, a reflector which prevents loss of flashlight rays can be manufactured.

In this embodiment, although the cross-sectional shape of the reflector 20 is formed as an elliptical shape which is a conical curve, the sectional shape may be constituted by another conical curve such as a parabolic curve or a hyperbolic curve. In addition, the cross-sectional shape need not be constituted by a perfectly conical curve, and the elliptical shape may be constituted by an approximate curve to a hyperbolic curve or a parabolic curve, a matter of course.

A second embodiment of the present invention will be described below with reference to the FIGS. 6 to 10.

Figure 6:
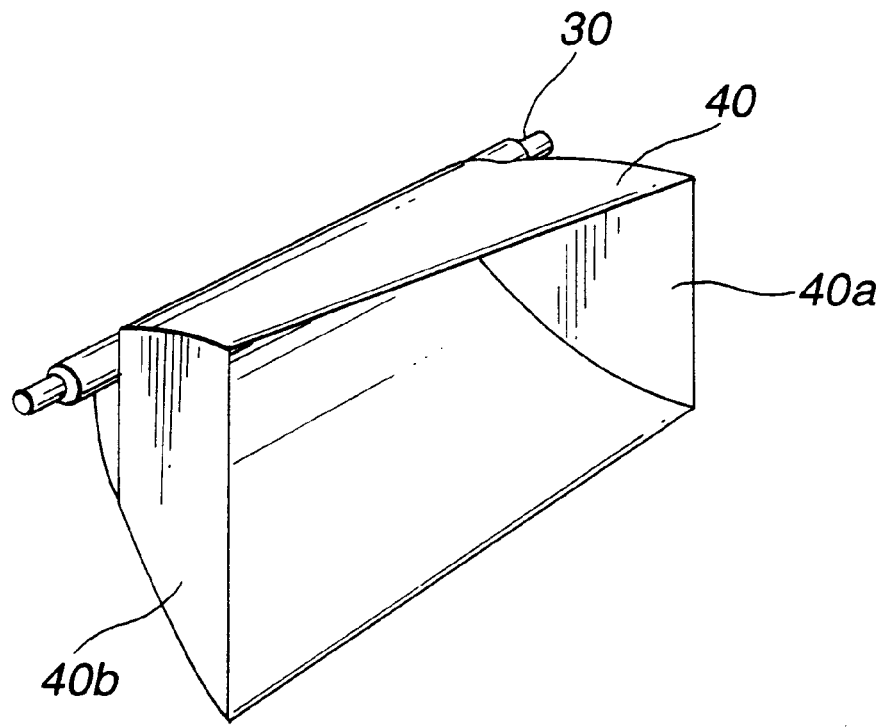
FIG. 6 is a perspective view showing the appearance of a flashlight-emitting device for a camera according to a second embodiment of the present invention.
Figure 7:
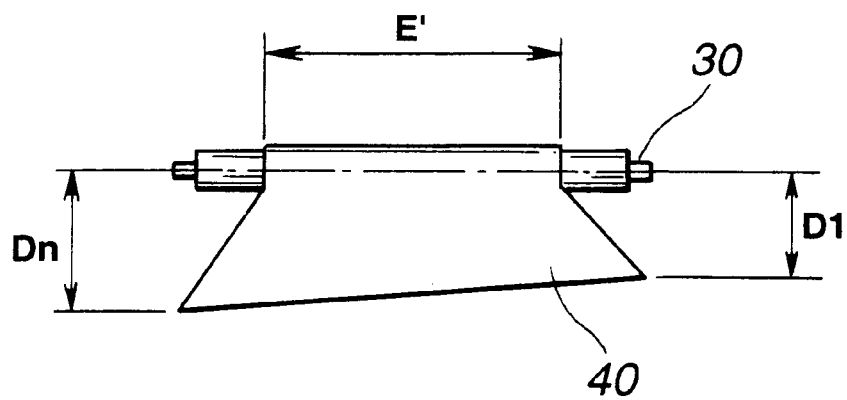
FIG. 7 is an upper view showing the flashlight-emitting device for a camera according to the second embodiment.
Figure 8:
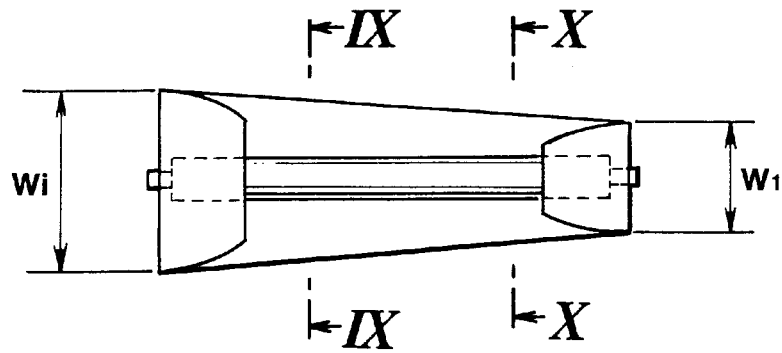
FIG. 8 is a front view showing the flashlight-emitting device for a camera according to the second embodiment when viewed from an opening portion side.

The second embodiment illustrates a flashlight-emitting device used in a camera as an illumination device as in the first embodiment. FIG. 6 is a perspective view showing the arrangement of a flashlight-emitting device according to the second embodiment, and FIG. 7 is an upper view showing the flashlight-emitting device. FIG. 8 is a front view for explaining the shape of the opening portion of the flashlight-emitting device, and FIGS. 9 and 10 are cross-sectional views showing the cross sections of the reflector shown in FIG. 8.

As shown in FIGS. 6 to 10, the shape in the second embodiment is obtained by cutting the reflector 20 described in the first embodiment of FIG. 3 at the center. More specifically, as shown in FIG. 6, the side reflecting plates 40a and 40b formed on reflector 40 are planar. As in the first embodiment, the planar sides diverge from the end portions of an effective light-emitting region E' of a flashlight discharge tube 30 to the opening portion as shown in FIG. 7. However, the second embodiment is different from the first embodiment in the following points. That is, the planar plates are formed such that a depth D gradually increases from D1 to Dn along the axis of the flashlight discharge tube 30, and, as shown in FIG. 8, an opening width W of the front opening portion linearly changes from W1 to Wi in corresponding fashion.

Figure 9:
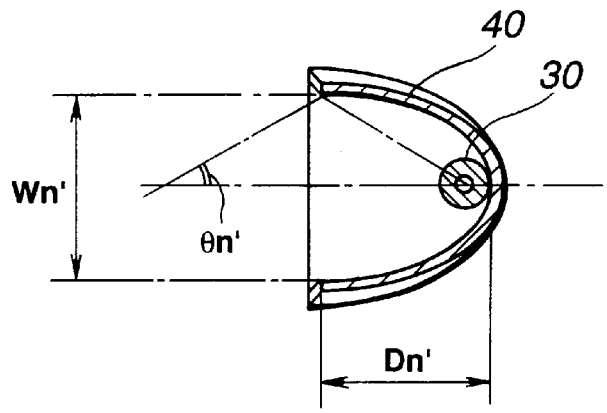
FIG. 9 is a cross-sectional view showing the central section of the flashlight-emitting device for a camera according to the second embodiment.
Figure 10:
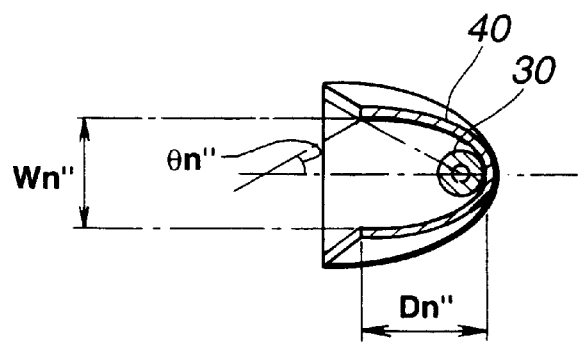
FIG. 10 is a cross-sectional view showing a section of the flashlight-emitting device for a camera according to the second embodiment to one side with respect to the center of the device.

FIGS. 9 and 10 show two cross-sections perpendicular to the longitudinal axis direction of the flashlight discharge tube 30 within the effective light-emitting region E' of the flashlight discharge tube 30. As in the first embodiment, the cross-sectional shapes shown in FIGS. 9 and 10 are elliptical having an opening width Wn' and a depth Dn', and an opening with Wn'' and a depth Dn'', respectively. The axial center of the flashlight discharge tube 30 is located along the first focal point positions of these ellipses.

Therefore, at the two cross-sections discussed above, substantially all the rays of light emitted from the flashlight discharge tube 30 are reflected by the reflector 40 at an angle of θn' or θn'' and then reflected within the range passing through the second focal points of the ellipses.

As described above, the shapes and/or sizes of the cross-sections perpendicular to the axis direction of the flashlight discharge tube 30 are made different from each other so that the reflection efficiency is not degraded. Therefore, when the exposure area of the opening portion of the camera body in which the reflector is set is not equal to the size of the opening portion of the reflector, or when the shape of the opening portion of the reflector must be changed for design purposes, if the opening portion of the reflector has a varying opening width W, a reflector which prevents loss of flashlight rays can be manufactured.

In the second embodiment, although the cross-sectional shape of the reflector is elliptical, the cross-sectional shape may be constituted by another conical curve such as a parabolic curve or a hyperbolic curve or an approximate curve to these curves.

Figure 11:
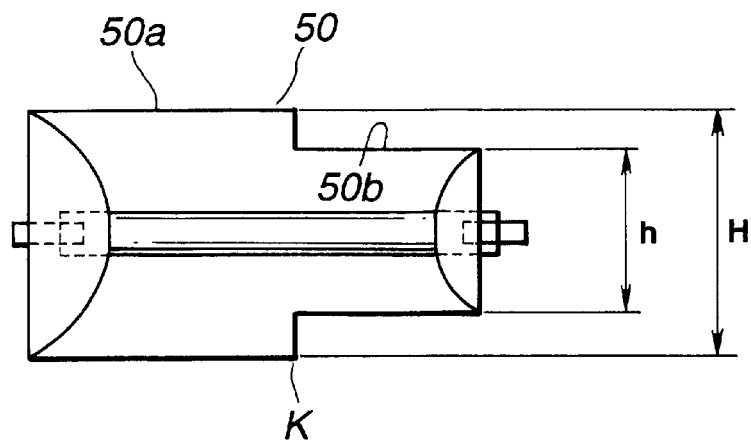
FIG. 11 is a front view showing a flashlight-emitting device according to a third embodiment of the present invention when viewed from the opening portion side.
Figure 12:
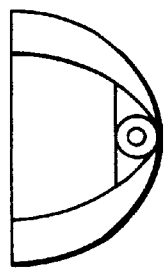
FIG. 12 is a side view showing the flashlight-emitting device for a camera according to the third embodiment.

A third embodiment of the present invention will be described with reference to FIGS. 11 and 12.

The first and second embodiments are constituted such that the different cross-sections perpendicular to the longitudinal axis direction of a light-emitting tube form a continuous profile when viewed from the front opening portion. However, the third embodiment is different from the first and second embodiments in that a reflector 50 has one discontinuous section. More specifically, as shown in FIG. 11, the reflector 50 is formed by coupling a first reflector 50a constituted by successive cross-sections each having a height H to a second reflector 50b constituted by successive cross-sections each having a height h smaller than the height of the first reflector 50a. A coupling region K between the first reflector 50a and the second reflector 50b forms a section having a discontinuous profile. FIG. 12 is a right-side view of FIG. 11.

As described above, according to the third embodiment, even if the height of the opening portion of the camera body in which the reflector is set changes at the coupling region K for schematic or design convenience purposes, when the shape of the reflector is changed in accordance with the height of the camera body opening portion, a reflector which prevents loss of flashlight rays can be manufactured.

Figure 13:
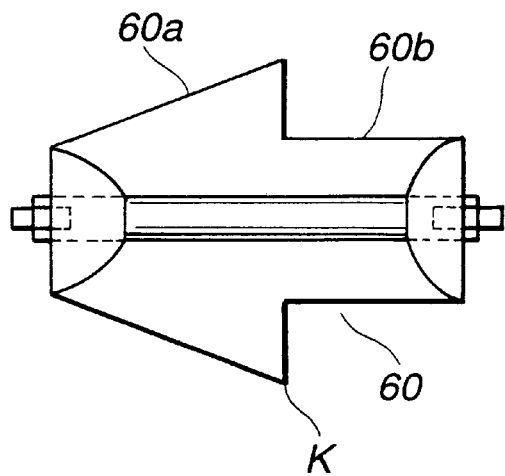
FIG. 13 is a front view showing a flashlight-emitting device according to a fourth embodiment of the present invention when viewed from the opening portion side.
Figure 14:
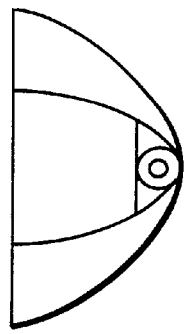
FIG. 14 is a side view showing the flashlight-emitting device for a camera according to the fourth embodiment.

A fourth embodiment of the present invention will be described below with reference to FIGS. 13 and 14.

The first and second embodiments are constituted such that the different cross-sections perpendicular to the longitudinal axis direction of the light-emitting tube are continuous in profile when viewed from the front opening portion. However, the fourth embodiment is different from the first and second embodiments in that a reflector 60 is constituted by a first reflector 60a having successive but differently sized cross-sections and a second reflector 60b having successive equally sized cross-sections. More specifically, as shown in FIG. 13, the shape of the reflector 60 is constituted by coupling the first reflector 60a and the second reflector 60b to each other at a coupling region K having a discontinuous profile. FIG. 14 is a right-side view of FIG. 13.

As described above, according to the fourth embodiment, the reflector is constituted by combining the section having varying cross sections and the section having uniform cross-sections together. For this reason, the reflector can cope with a case wherein the shape of the opening portion of the camera body in which the reflector is set changes for schematic or design convenience purposes without loss of flashlight rays.

Figure 15:
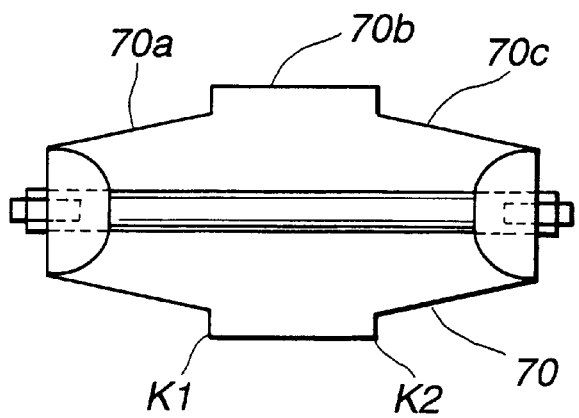
FIG. 15 is a front view showing a flashlight-emitting device according to a fifth embodiment of the present invention when viewed from the opening portion side.
Figure 16:
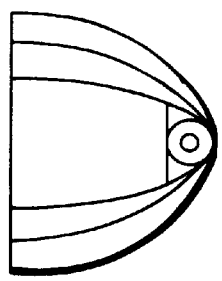
FIG. 16 is a side view showing the flashlight-emitting device for a camera according to the fifth embodiment.

A fifth embodiment of the present invention will be described below with reference to FIGS. 15 and 16.

The fourth embodiment is constituted such that the reflector 60 is constituted by a portion having different successive cross-sections and a portion having the same successive cross-sections. However, a reflector according to the fifth embodiment is constituted by a further combination of these portions. More specifically, as shown in FIG. 15 and FIG. 16 obtained by viewing FIG. 15 from the right, first and third reflectors 70a and 70c having different successive cross-sections are arranged on both sides of a second reflector 70b having the same successive cross-sections, and coupling regions K1 and K2 between the reflectors 70a and 70c and the reflector 70b have discontinuous profiles. Therefore, according to the fifth embodiment, the same effect as provided by the fourth embodiment can be obtained.

A sixth embodiment of the present invention will be described below with reference to FIGS. 17 and 18.

Figure 17:
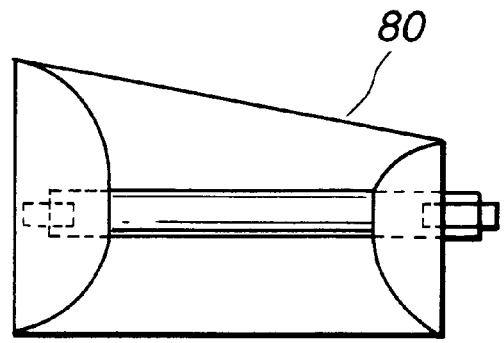
FIG. 17 is a front view showing a flashlight-emitting device according to a sixth embodiment of the present invention when viewed from the opening portion side.
Figure 18:
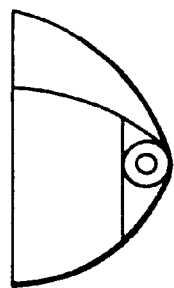
FIG. 18 is a side view showing the flashlight-emitting device for a camera according to the sixth embodiment.

According to the sixth embodiment, in a reflector 80 in which a portion having different successive cross-sections and a portion having the same successive cross-sections as shown in FIG. 17 and in the side view of FIG. 18 obtained by viewing FIG. 17 from the right, the portion having different successive cross-sections is formed on the upper side of the center axis of the light-emitting tube, and the portion having the same successive cross-sections is formed on the lower side of the center axis of the light-emitting tube.

Therefore, according to the sixth embodiment, in addition to the effect of the fourth embodiment, the same effect can be specially obtained when the upper side of the center axis of the light-emitting tube is restricted.

Figure 19:
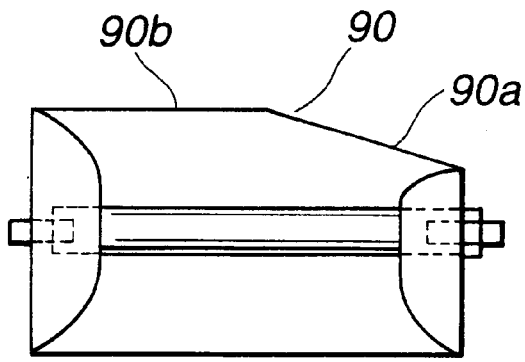
FIG. 19 is a front view showing a flashlight-emitting device according to a seventh embodiment of the present invention when viewed from the opening portion side.
Figure 20:
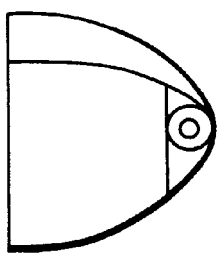
FIG. 20 is a side view showing the flashlight-emitting device for a camera according to the seventh embodiment.

A seventh embodiment of the present invention will be described below with reference to FIGS. 19 and 20.

A reflector according to the seventh embodiment is obtained by improving the sectional portion having the different successive cross-sections formed on the upper side of the center axis of the light-emitting tube of the sixth embodiment. In the reflector 90, as shown in FIG. 19 and in the side view of FIG. 20 obtained by viewing FIG. 19 from the right, a sectional portion 90a having different successive cross-sections and a portion 90b having the same successive cross-sections are formed on the upper side of the center axis of a light-emitting tube. Therefore, the same effect as in the sixth embodiment can be obtained.

An eighth embodiment of the present invention will be described below with reference to FIGS. 21 and 22.

Figure 21:
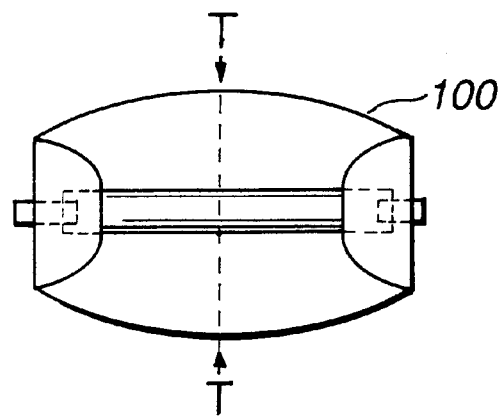
FIG. 21 is a front view showing a flashlight-emitting device according to an eighth embodiment of the present invention when viewed from the opening portion side.
Figure 22:
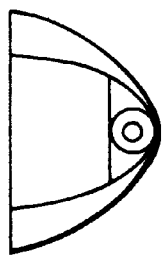
FIG. 22 is side view showing the flashlight-emitting device for a camera according to the eight embodiment.

FIG. 21 is a front view of the eighth embodiment. As shown in FIG. 21, the outside profile lines on both sides of the center axis of the light-emitting tube are constituted by conical curves such as elliptical curves or parabolic curves, and the outside profile lines are symmetrical with respect to a center line T passing through the center of the light-emitting tube. The shape of a cross-section perpendicular to the center line of the light-emitting tube is also constituted by a conical curve such as an elliptical curve or a parabolic curve. FIG. 22 is a right-side view of FIG. 21.

The reflectors having a discontinuous profiles at regions K between different sectional portions have been described in the third to eighth embodiments. An example wherein one of these reflectors is actually incorporated into a camera will be described below.

Figure 23:
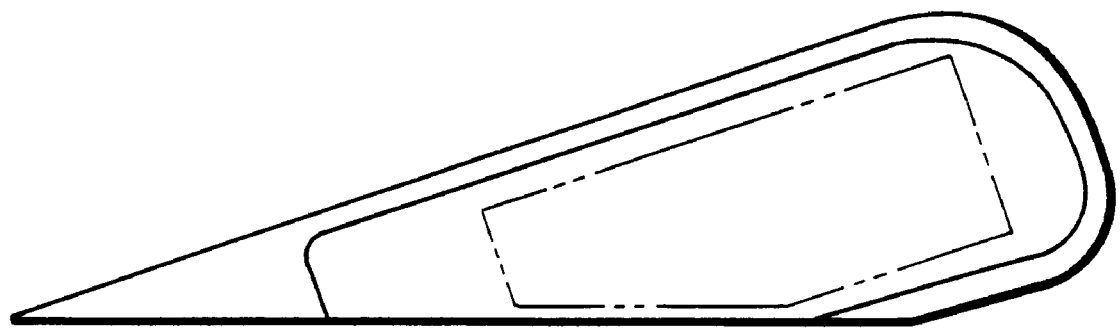
FIG. 23 is a view showing a state wherein a reflector used in the flashlight-emitting device for a camera according to the seventh embodiment is built in a flash unit.
Figure 24:
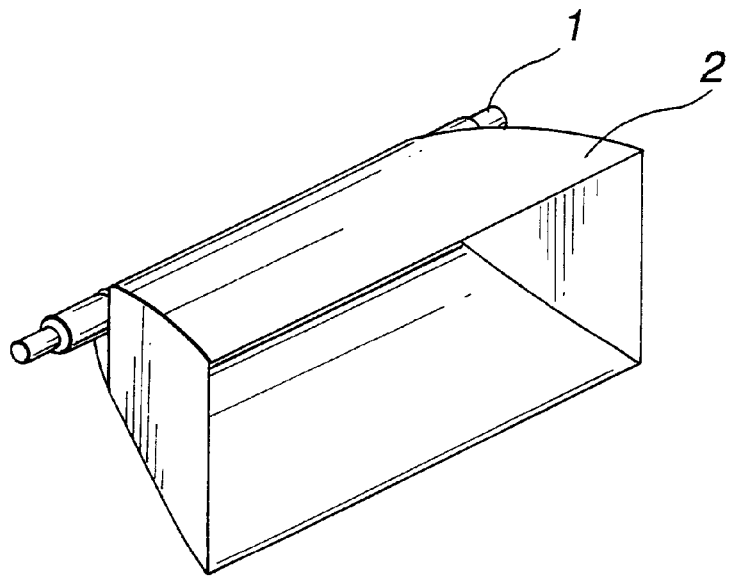
FIG. 24 is a perspective view showing the appearance of a conventional flashlight-emitting device for a camera to explain the flashlight-emitting device.
Figure 25:
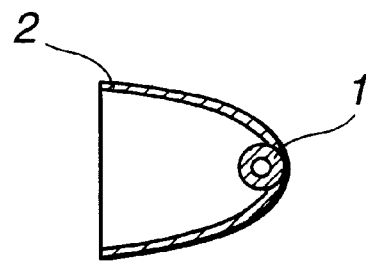
FIG. 25 is a cross-sectional view showing the conventional flashlight-emitting device at an arbitrary position.
Figure 26:
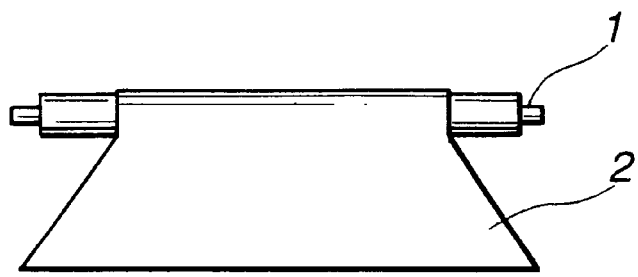
FIG. 26 is an upper view showing the conventional flashlight-emitting device for a camera.
Figure 27:
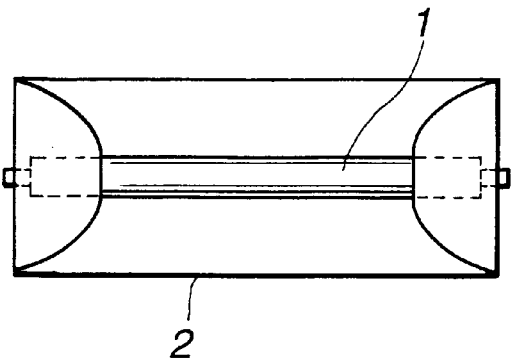
FIG. 27 is a front view showing the conventional flashlight-emitting device when viewed from an opening portion side.
Figure 28:
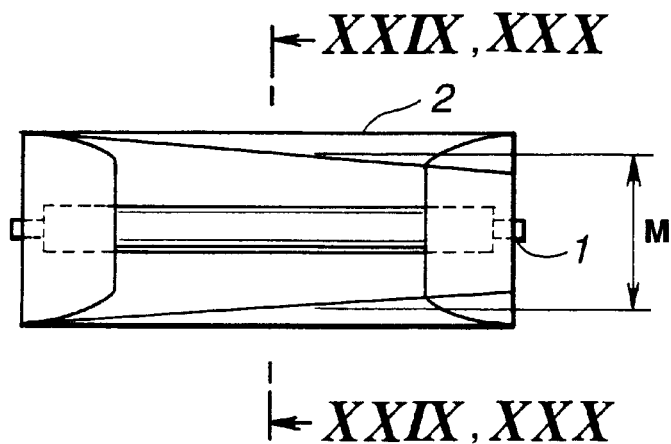
FIG. 28 is a view for explaining a state wherein the shape of the opening portion of the conventional flashlight-emitting device is changed with respect to the opening portion of the camera.
Figure 29:
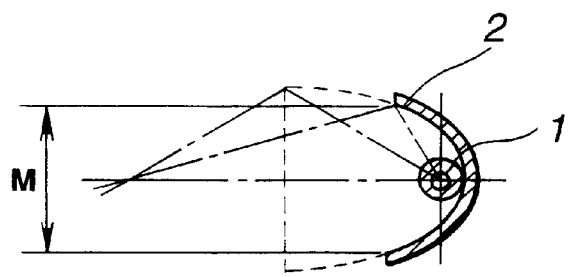
FIG. 29 is a cross-sectional view for explaining a problem occurring when the opening portion of the conventional flashlight-emitting device is partially cut away.
Figure 30:
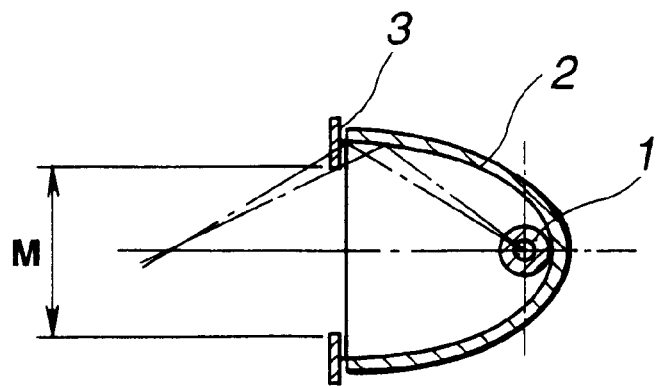
FIG. 30 is a cross-sectional view for explaining a problem occurring when the opening portion of the conventional flashlight-emitting device is partially masked.
Figure 31:
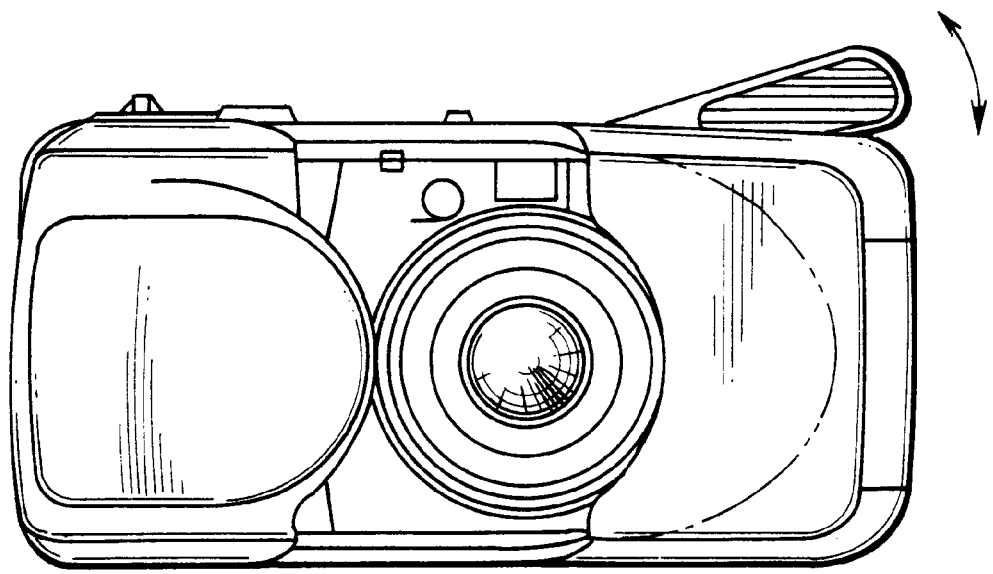
FIG. 31 is a view showing the appearance of a conventional camera having a flash unit.
Figure 32:
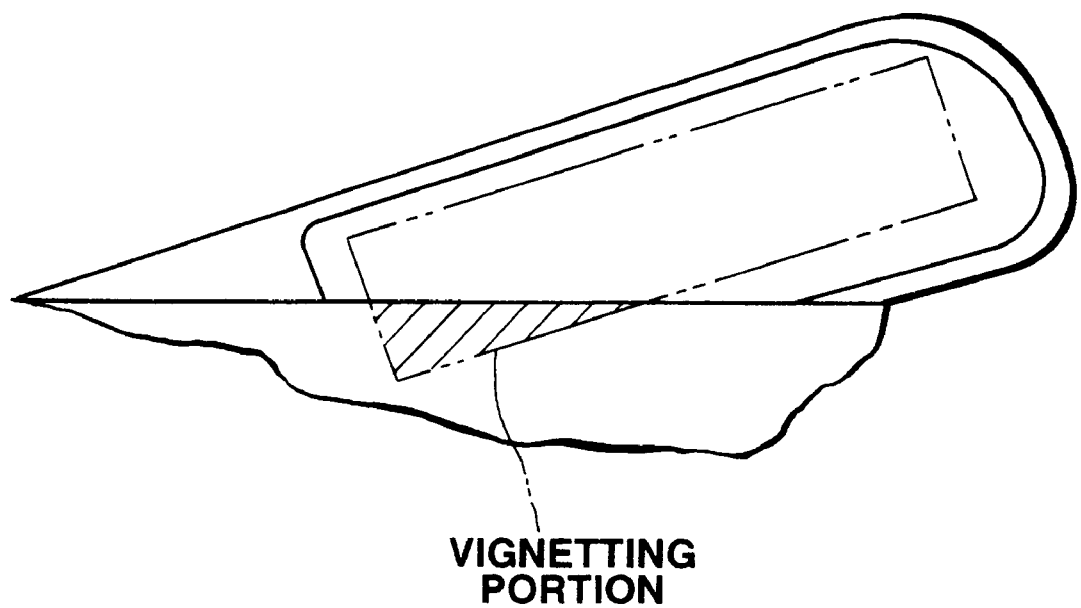
FIG. 32 is a view for explaining a vignetting portion in a state wherein the flash unit in the conventional camera is in use.

FIG. 23 shows an example wherein the reflector of the seventh embodiment (see FIG. 19 and FIG. 20) is built in a flash unit (see FIG. 31 and FIG. 32) arranged on a conventional camera. In this example, an amount of irradiated light is prevented from being reduced by a "vignetting portion" (see FIG. 32) resulting from design convenience. More specifically, the portion corresponding to the "vignetting portion" is cut away to obtain a light-irradiating reflector having the shape (see the double-chain line) shown in FIG. 19. In this manner, the amount of irradiated light is prevented from being reduced, and high efficiency light distribution can be realized as a whole.

Although the embodiments of the present invention have been described above, the present invention can be applied to not only an illumination device for a camera but also to any illumination device. In addition, an optical member such as a Fresnel lens may be arranged on the front surface of the reflector, as a matter of course.

According to the present invention, there is provided an illumination device which is free from the loss of light rays commonly experienced with conventional illumination devices when the exposure area of the opening portion of a camera body in which a reflector is set is not equal to the size of the opening portion of the reflector. Using the illumination device of the present invention, light rays which were previously lost can now be effectively used. Since the design of the camera is regarded as the most important consideration, even if the shape of the front opening portion of the reflector is different from the shape of the opening portion of the camera, the present inventions provides an illumination device having a highly efficient convergence of light.

In this invention, it is apparent that a wide variety of different working modes can be formed on this basis of this disclosure without departing from the spirit and scope of the invention. This invention is not restricted by any specific embodiment except being limited by the appended claims.

What is claimed is:

1. An illumination device comprising:
   a light-emitting tube having a longitudinal axis disposed in an axis direction; and
   a reflector for reflecting rays of light irradiated from said light-emitting tube,
   wherein a cross-section of at least one section of said reflector in a plane perpendicular to the axis direction of said light-emitting tube is different from a cross-section of at least one other section in a plane perpendicular to the axis direction of said light-emitting tube.

2. An illumination device according to claim 1, wherein said reflector has cross-sections which continuously and gradually change in the axis direction of said light-emitting tube and which are perpendicular to the axis direction of said light-emitting tube.

3. An illumination device according to claim 1, wherein only a portion of each of the cross-sections of at least one section of said reflector continuously and gradually changes in the axis direction of said light-emitting tube.

4. An illumination device according to claim 1, wherein said reflector has adjacent sections which have discontinuous profiles at a junction of the adjacent sections in the axis direction of said light-emitting tube.

5. An illumination device according to claim 1, wherein said reflector has adjacent sections which have discontinuous profiles alone only one side of a junction of the adjacent sections in the axis direction of said light-emitting tube.

6. An illumination device according to claim 1, wherein said reflector has at least one of a section having cross-sections which continuously and gradually change in the axis direction of said light-emitting tube and which are perpendicular to the axis direction of said light-emitting tube, and adjacent sections which have discontinuous profiles at a junction thereof in the axis direction of said light-emitting tube.

7. An illumination device according to claim 1, wherein said reflector has at least one of a section in which only a portion of each of the cross-sections thereof continuously and gradually changes in the axis direction of said light-emitting tube, and adjacent sections which are discontinuous along only one profile line at a junction thereof along the axis direction of said light-emitting tube.

8. An illumination device comprising:
   a flashlight-emitting tube having a longitudinal axis disposed in an axis direction; and
   a reflector in which a cross-sectional shape perpendicular to the axis direction of said flashlight-emitting tube is expressed by a conical curve,
   wherein said flashlight-emitting tube is arranged at a focal point position which is shared by successive conical-curve cross-sections of said reflector, and wherein said reflector is formed by successive conical-curved cross-sections including conical-curved cross-sections having different shapes or sizes.

9. An illumination device according to claim 8, wherein said illumination device is a flashlight-emitting device for a camera.

10. An illumination device according to claim 8, wherein said reflector has conical-curved cross-sections which are substantially symmetrical with respect to said light-emitting tube.

11. An illumination device according to claim 8, wherein all the cross-sections of said reflector are conical curves having different shapes or sizes from each other.

12. An illumination device comprising:

a light emitting tube; and a reflector for reflecting rays of light emitted from the light-emitting tube, wherein the cross-sections of the reflecting surfaces of said reflector which are perpendicular to the longitudinal direction of the light-emitting tube are different from each other in the longitudinal direction of said light-emitting tube.

13. An illumination device according to claim 12, wherein the cross-sectional shapes of said reflecting surfaces are expressed by conical curves.

14. A flashlight-emitting device for a camera, comprising:

a flashlight-emitting tube having a longitudinal axis disposed in an axis direction; and a reflector in which a cross-sectional shape perpendicular to the axis direction of said flashlight-emitting tube is expressed by a conical curve, wherein said flashlight-emitting tube is arranged at a focal point position which is shared by successive conical-curved cross-sections of said reflector, and wherein said reflector has conical-curved cross-sections which are different from each other along an effective light-emitting region of said flashlight-emitting tube.

15. A flashlight-emitting device for a camera, comprising:

a flashlight-emitting tube having a central axis disposed in a longitudinal direction; and a reflector for reflecting rays of light emitted from said flashlight-emitting tube, wherein said reflector includes a first portion having successive cross-sections which gradually change along the longitudinal direction of said flashlight-emitting tube, and a second portion having the same successive cross-sections in said longitudinal direction.

16. A flashlight-emitting device according to claim 15, wherein a coupling region between the first portion and the second portion has a discontinuous profile in said longitudinal direction.

17. A flashlight-emitting device according to claim 15, wherein the first portion and the second portion are both arranged on one side of the central axis of said flashlight-emitting tube.

18. A flashlight-emitting device according to claim 16, wherein the first portion and the second portion are both arranged on one side of the central axis of said flashlight-emitting tube.

19. A flashlight-emitting device according to claim 15, wherein the first portion is arranged only on one side of the central axis of said flashlight-emitting tube, and the second portion is arranged only on the other side of the central axis of said flashlight-emitting tube.

20. A flashlight-emitting device for a camera, comprising:

a flashlight-emitting tube having a central axis disposed in a longitudinal direction; and a reflector for reflecting light emitted from said flashlight-emitting tube, wherein said reflector includes a first portion having same successive cross-sections each having a first height and a second portion having same successive cross-sections each having a second height smaller than that of the first height, and a coupling region between the first portion and the second portion has a discontinuous profile in the longitudinal direction of the flashlight-emitting tube.

21. A flashlight-emitting device according to claim 20, wherein the second portion further includes different conical-curved cross-sections having outermost points whose distances from the central axis of said flashlight-emitting tube change depending on the position of the cross-section along said axis.

22. A reflector to which a light-emitting tube having a longitudinal axis can be attached and which reflects rays of light irradiated from said light-emitting tube when attached thereto, wherein the reflector has cross-sectional shapes perpendicular to the longitudinal axis which are defined by conical curves, and wherein at least one of the conical-curved cross-sections is different from at least one other conical-curved cross-section at another position along the longitudinal axis of said light-emitting tube.

23. A reflector to which a light-emitting tube having a longitudinal axis can be attached and which reflects rays of light irradiated from said light-emitting tube when attached thereto, wherein the reflector has cross-sectional shapes perpendicular to the longitudinal axis of said attached flashlight-emitting tube which are defined by conical curves, and wherein the conical-curved cross-sections change gradually along the longitudinal axis.

24. A flashlight-emitting device comprising:

a shaft-like light-emitting tube having a longitudinal axis disposed in an axis direction; and a reflector for reflecting light emitted from the shaft-like light-emitting tube, wherein the reflector has cross-sections which are perpendicular to the longitudinal axis of said light-emitting tube, and said cross-sections are different from each other while an amount of reflected light from each of the cross-sections are equal.

25. A flashlight-emitting device according to claim 24, wherein the cross-sections of said reflector continuously and gradually change in the axis direction of said light-emitting tube.

26. A flashlight-emitting device according to claim 24, wherein the cross-sections of said reflector discontinuously changes at least at one position in the axis direction of said light-emitting tube.

* * * * *